United States Patent [19]

Takahashi et al.

[11] Patent Number: 4,749,205
[45] Date of Patent: Jun. 7, 1988

[54] STEERING SYSTEM FOR MOTOR VEHICLE

[75] Inventors: Hirotake Takahashi; Toru Iiizumi, both of Saitama, Japan

[73] Assignee: Honda Giken Kogyo Kabushiki Kaisha, Tokyo, Japan

[21] Appl. No.: 885,872

[22] Filed: Jul. 15, 1986

[30] Foreign Application Priority Data

Jul. 15, 1985 [JP] Japan .................. 60-155604
Jul. 17, 1985 [JP] Japan .................. 60-157660

[51] Int. Cl.⁴ ............................. B60G 9/02
[52] U.S. Cl. .................. 280/95 R; 280/660
[58] Field of Search .......... 280/282, 660, 95 R, 280/95 A; 180/210, 215, 252, 253

[56] References Cited

U.S. PATENT DOCUMENTS 4,535,869 8/1985 Tsutsumikoshi et al. .......... 180/215
4,540,061 9/1985 Watanabe ..................... 180/215

FOREIGN PATENT DOCUMENTS 648906 9/1962 Canada ....................... 280/660
15015 9/1980 European Pat. Off. ........... 280/660
605920 8/1948 United Kingdom ............. 280/95 R Primary Examiner—Ross Weaver
Attorney, Agent, or Firm—Irving M. Weiner; Joseph P. Carrier; Pamela S. Burt

[57] ABSTRACT

A steering system in a motor vehicle having a frame includes a swing arm by which steerable wheels are swingably supported on the frame, a steering shaft extending substantially vertically in the frame and angularly movable about its own axis, a steering arm fixed to a lower end of the steering shaft, a connecting rod having one end pivotally coupled to the steering arm, a pivot arm swingable in unison with the swing arm and operatively coupled to an opposite end of the connecting rod, and a pair of tie rods having ends pivotally coupled to the pivot arm and opposite ends on which the steerable wheels are angularly movably supported. A point where the connecting rod is coupled to the steering arm is positioned in a space range which is swept by the swing arm when it is angularly moved about the shaft.

9 Claims, 5 Drawing Sheets

STEERING SYSTEM FOR MOTOR VEHICLE

BACKGROUND OF THE INVENTION

1. Field of the Invention:

The present invention relates to a steering system for motor vehicles, and more particularly to a steering system for four-wheel-drive motor vehicles such as buggies designed for off-road use.

2. Description of the Relevant Art:

Some motor vehicles of four-wheel drive design have two steerable front wheels rotatably supported on a vehicle body by swing arms extending in the longitudinal direction of the motor vehicle. Japanese Laid-Open Patent Publication No. 60(1985)-234072 filed by the applicant who is the assignee of the present application, discloses a steering system for a four-wheel-drive motor vehicle. According to the disclosed steering system, a V-shaped steering arm is attached to the lower end of a steering shaft connected to a steering handlebar, and ends of two tie rods are coupled to the arms of the V-shaped steering arm in an X-shaped configuration. The opposite ends of the tie rods are connected respectively to the knuckle arms of steerable wheels.

In the aforesaid steering system, the relatively long tie rods extending obliquely inwardly of the steerable wheels impose a limitation on the layout of components between suspensions of the wheels, particularly a gear case mounted on a drive axle for the wheels. Since the intersecting tie rods are disposed one over the other, they require a certain vertical space for their installation. Accordingly, the steering system of the type described above is disadvantageously in that it takes up a relatively large space in which it is positioned.

SUMMARY OF THE INVENTION

In view of the aforesaid problems, it is an object of the present invention to provide a steering system for use in motor vehicles, which includes two tie rods lying in one plane without intersecting or extending obliquely, thereby providing a space for greater layout leeway for components near steerable wheels and a steering mechanism, and also providing an advantageous arrangement for protection of the steering mechanism.

Another object of the present invention is to provide a steering system for a motor vehicle, which has a connecting rod operatively coupled to steerable wheels for steering the same and so connected to a steering shaft that the extent of toeing of the steerable wheels, which is caused when they bound or rebound, can be reduced to minimize any kickback on a steering handlebar due to such forced toeing.

According to the present invention, there is provided a steering system in a motor vehicle having a frame including a pair of steerable wheels, a swing arm by which the steerable wheels are swingably supported on the frame, a steering shaft extending substantially vertically in the frame and angularly movable about its own axis, a steering arm fixed to a lower end of the steering shaft, a connecting rod having one end pivotally coupled to the steering arm, a pivot arm swingable in unison with the swing arm and operatively coupled to an opposite end of the connecting rod, and a pair of tie rods having ends pivotally coupled to the pivot arm and opposite ends on which the steerable wheels are angularly movably supported. A point where the connecting rod is coupled to the steering arm is positioned in a space range which is swept by the swing arm when it is angularly moved about the shaft. The space range includes a range in which the swing arm is angularly moved when the steerable wheels bound and rebound to maximum levels.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENTS

Figure 1:
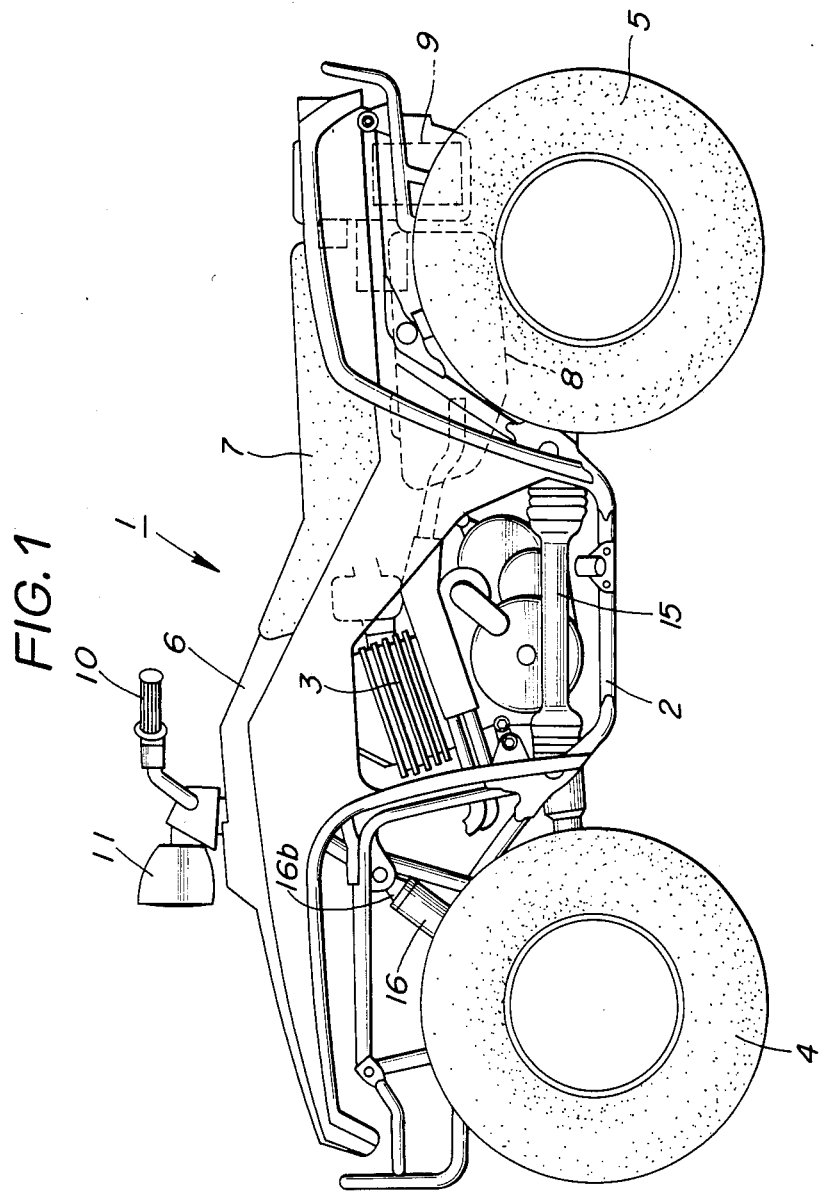
FIG. 1 is a side elevational view of a fourwheel-drive buggy.

As illustrated in FIG. 1, a four-wheel-driven motor vehicle 1 such as a buggy includes a frame 2 supporting an engine 3 on its central portion and front and rear wheels 4, 5 rotatably mounted on the frame 2. The engine 3 and the frame 2 are covred with a cover 6 on which a driver's saddle seat 7 is disposed rearwardly and upwardly of the engine 3. A fuel tank 8 is supported on the frame 2 below the saddle seat 7, and a battery 9 is also supported on the frame 2 rearwardly of the fuel tank 8. A steering handlebar 10 is angularly movably positioned forwardly of the saddle seat 7 and supports a headlight 11 on its front side.

Figure 2:
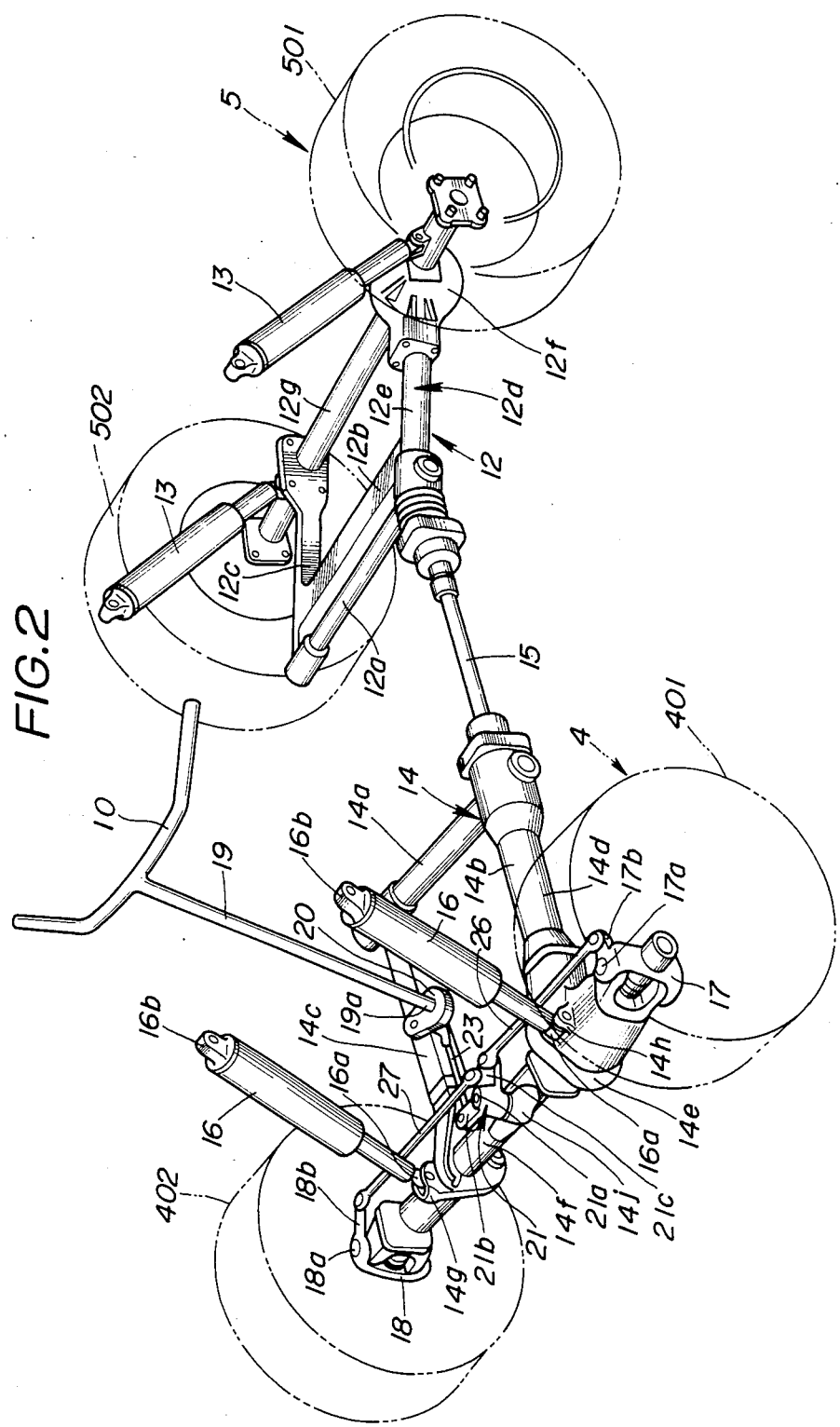
FIG. 2 is a perspective view of suspension mechanisms for front and rear wheels of the buggy shown in FIG. 1.

FIG. 2 shows suspension mechanisms of the motor vehicle 1. As illustrated, the suspension mechnism for the front wheels 4 is of the leading-arm type, whereas the suspension mechanism for the rear wheels 5 is of the trailing-arm type.

More specifically, the rear wheels, designated at 501, 502 in FIG. 2, are swingably supported by a trailing arm 12 serving as a swing arm. The trailing arm 12 comprises two lateraly spaced members 12c, 12d integrally joined to each other by a cross member 12b and a shaft 12a in a rear portion of the frame 2. The rear wheels 501, 502 are swingable about the shaft 12a. The member 12d comprises a sleeve 12e housing a propeller shaft therein and a gear case 12f joined to the rear end of the sleeve 12e. A hollow axle support member 12g extend transversely between and through the rear ends of the members 12c, 12d. The rear wheels 501, 502 are driven by a drive axle rotatably accommodated in the axle support member 12g. Two rear cushioning units 13 have lower ends connected to the axle support member 12g near opposite ends thereof and upper ends pivotally joined to the frame 2.

The front wheels, designated at 401, 402 in FIG. 2, are swingably supported by a leading arm 14 serving as a swing arm. The leading arm 14 comprises two lateraly spaced, substantially parallel members 14b, 14c integrally joined to each other by a cross member 14i (see FIG. 3) and a shaft 14a in a front portion of the frame 2. The front wheels 401, 402 are swingable about the shaft 14a. The member 14b comprises a sleeve 14d housing a propeller shaft therein and a gear case 14e joined to the front end of the sleeve 14d. A hollow axle support member 14f extends transversely between and through the front ends of the members 14b, 14c. The front wheels 401, 402 are driven by a front drive axle 30 rotatably accommodated in the axle support member 14f. The propeller shafts disposed in the front and rear sleeves 14d, 12e are interconnected by a transmission rod 15 which transmits engine output power to the propeller shafts. Two front cushioning 16 have lower ends 16a pivotally mounted on brackets 14g, 14h, respectively, on the axially opposite ends of the axle support member 14f, and upper ends 16b pivotally coupled to the frame 2.

Figure 3:
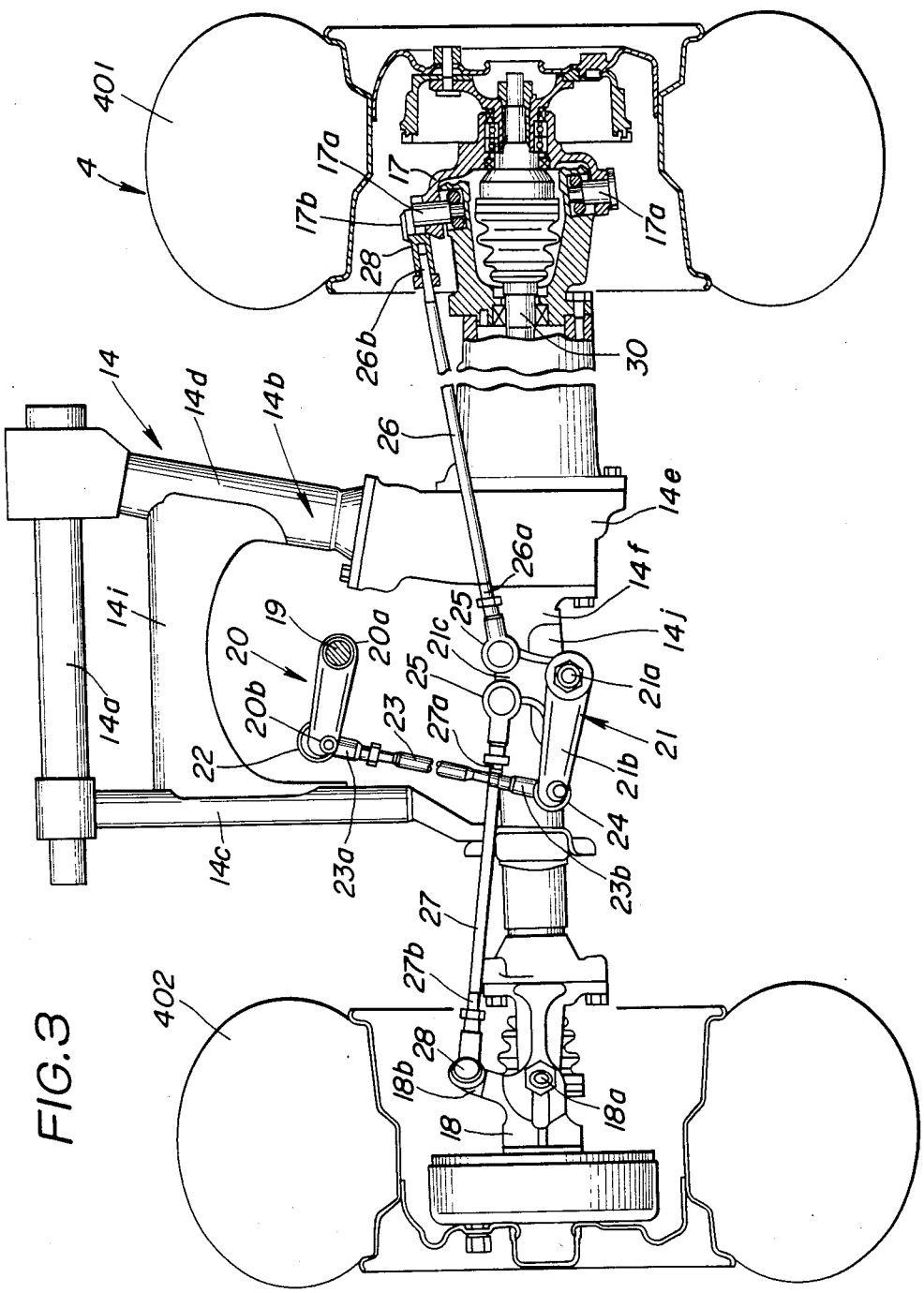
FIG. 3 is a plan view of a steering system of the present invention, installed on a front portion of the buggy, one of two wheels being shown in sectional front elevation.

FIGS. 2 and 3 illustrate a steering system of the motor vehicle 1. Knuckle arms 17, 18 are angularly movably supported respectively on the opposite ends of the axle support member 14f by means of kingpins 17a, 18a. The knuckle arms 17, 18 are angularly movable in a substantially horizontal plane. The front wheels 401, 402 are supported by the knucle arms 17, 18, respectively. The knuckle arms 17, 18 include arm members 17b, 18b, respectively, extending rearwardly.

As shown in FIG. 2, the steering handlebar 10 is coupled to the upper end of a steering shaft 19 extending substantially vertically between the members 14b, 14c of the leading arm 14 and positioned substantially centrally in the leading arm 14 in the longitudinal direction thereof. The steering shaft 19 has a lower end 19a to which there is fixed one end 20a of a steering arm 20 extending laterally to one side of the steering shaft 19. The steering arm 20 are in the form of an elongate plate. A support boss 14j projects forwardly from a transversely central portion of the axle support member 14f. A pivot arm 21 is pivotally joined at one end thereof to the support boss 14j by a pivot pin 21a. The pivot arm 21 is angularly movable in a substantially horizontal plane. The pivot arm 21 has a first arm member 21b extending laterally to one side of the support boss 14j and a second wider arm member 21c extending rearwardly. The first arm member 21b is positioned higher than the second arm member 21c.

As shown in FIG. 3, the other end 20b of the steering arm 20 is coupled by a universal joint 22 to a rear end 23a of a connecting rod 23 extending forwardly, while a front end 23b of rod 23 is coupled by a universal joint 24 to the distal end of the first arm member 21b of the pivot arm 21. Two tie rods 26, 27 have ends 26a, 27a pivotally coupled by respective joints 25 to the opposite sides of the rear end of the second arm member 21c of the pivot arm 21. The other ends 26b, 27b of the tie rods 26, 27 are pivotally coupled by respective joints 28 to the arm members 17b, 18b, respectively, of the knuckle arms 17, 18.

the tie-rods 26, 27 extend laterally from the pivot arm 21, which is positioned substantially longitudinally centrally of the drive axle 30 of the front wheels 401, 402, and lie over the axle support member 14f. The tie rods 26, 27 extend over the rear portion of and rearwardly of the axle support member 14f. The tie rods 26, 27 are positioned one on each side of a longitudinal central axis of the motor vehicle 1. As illustrated in FIG. 2, the tie rods 26, 27 are disposed behind the pivotally coupled lower ends 16a of the rear cushioning units 16, which are therefore located forwardly of the tie rods 26, 27.

When the steering handlebar 10 is turned clockwise or counterclockwise, the steering shaft 19 is turned about its own axis to swing the steering arm 20 about the axis of the steering shaft 19. The connecting rod 23 is therefore pulled or pushed longitudinally to angularly move the pivot arm 21 about the pivot pin 21a, pushing one of the tie rods 26, 27 and pulling the other tie rod substantially along the drive axle 30. The knuckle arms 17, 18 are therefore angularly moved about the kingpins 17a, 18a, respectively, for thereby steering the front wheels 401, 402.

According to the present invention, the extent of toeing of the front wheels 401, 402, which is caused by bounding and rebounding thereof, is reduced by making the leading arm 14 as a swing arm and the connecting rod 23 different in length. Such a reduction in the extent of toeing of the front wheels 401, 402 will be described in greater detail with reference to FIGS. 4 and 5.

Figure 4:
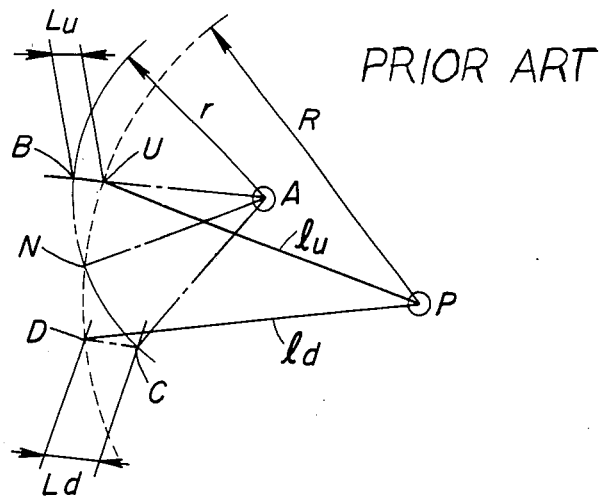
FIG. 4 is a diagrammatic side elevational view showing the manner in which a conventional steering system operates.

FIG. 4 schematically shows in side elevation a conventional steering system. In the conventional steering system, a swing arm length R and a connecting rod length r are different from each other. Also, a point A where the connecting rod is pivotally coupled to the steering arm is positioned above, as viewed in side elevation, a straight line 1u interconnecting a point P where the swing arm is pivotally coupled to the frame and a position U which is reached by the distal end of the swing arm when the wheels bound to a maximum extent. This conventional design has the following problem:

When the front wheels bound and rebound, particularly to maximum levels, positions B, C reached by the distal end of the connecting rod are displaced from positions U, D reached by the distal end of the swing arm in the longitudinal direction of the motor vehicle by relatively large intervals Lu, Ld, respectively. Therefore, the knuckle arms supporting the front wheels are caused to turn to angular extents commensurate with the intervals Lu, Ld, respectively, with the result that the front wheels are also forced to toe to relatively large extents. This toe change imposes kickback on the steering handlebar. The above problem also occurs in the case where the point A is positioned below a straight line 1d interconnecting the position D and the point P.

Figure 5:
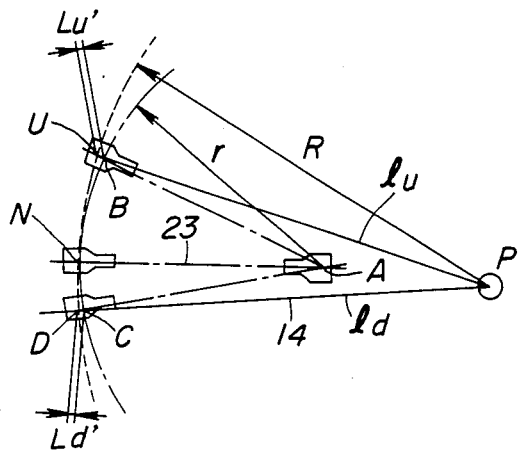
FIG. 5 is a diagrammatic side elevational view showing the manner in which the steering system of the invention operates.

In the steering system of the present invention, as schematically shown in FIG. 5, the point A where the connecting rod 23 is pivotally coupled to the steering arm 20 is positioned within a space range between, as viewed in side elevation, the upper straight line 1u interconnecting the point P where the leading arm 14 is pivotally coupled to the frame and the position U that is reached by the distal end of the leading arm 14 when the front wheels bound to a maximum level, and the lower straight line 1d interconnecting the point P and the position D that is reached by the distal end of the leading end 14 when the front wheels rebound to a maximum level.

With this arrangement, the point B where the connecting rod 23 is pivotally coupled to the pivot arm 21 is displaced only a small interval Lu' from the position U when the front wheels bound to a maximum level, and likewise the point C where the connecting rod 23 is pivotally coupled to the pivot arm 21 is displaced only a small interval Ld' from the position D when the front wheels rebound to a maximum level. Comparison of FIGS. 4 and 5 clearly indicates that any angular displacement of the pivot arm 21 caused by the connecting rod 23 due to a wheel alignment change upon bounding and rebounding can be greatly reduced. Hence, any lateral displacement of the tie rods 26, 27 caused by such angular displacement of the pivot arm 21 can also be greatly reduced, resulting in a extremely small amount of angular movement of the knuckle arms 17, 18. As a consequence, the extent of toeing of the front wheels 401, 402 which is caused by bounding the rebounding thereof is minimized, and so is the kickback on the steering handlebar which arises from an alignment change due to forced toeing of the front wheels.

In each of FIGS. 4 and 5, the distal end of the connecting rod is in a neutral position N when the front wheels are not subjected to bounding and no rebounding.

Figure 6:
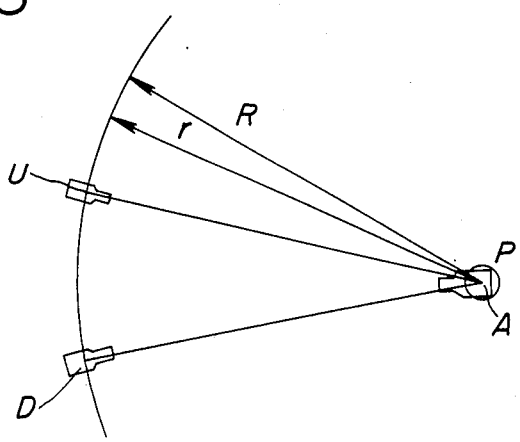
FIG. 6 is a diagrammatic side elevational view showing the manner in which a steering system according to another embodiment of the present invention operates.

FIG. 6 schematically shows a steering system according to another embodiment of the present invention. The point A where the connecting rod 23 is pivotally coupled to the steering arm 20 is positioned, as viewed in side elevation, substantially in alignment with the point P where the leading arm 14 is pivotally coupled to the frame.

The steering system of the present invention is highly advantageous for various reasons. Since the tie rods are positioned over the front drive axle one on each side of the longitudinal axis of the motor vehicle and are moved by the connecting rod which is positioned between the tie rods and actuated longitudinally by the steering arm, the components operated upon steering are movable in a small central range in the motor vehicle. The connecting rod does not underlie or overlie the gear case or the sleeve housing the propeller shaft which drives the front wheels in intersecting relation. Therefore, the connecting rod does not interfer with the components near and inward of the front wheels, allowing the components to be arranged in a relatively free layout. Inasmuch as the tie rods are disposed above the front drive axle and extend over the rear portion of and rearwardly of the front drive axle, the tie rods are protected by the front drive axle positioned between the tie rods and the ground and also by the front cushioning units disposed in front of the tie rods. Consequently, the steering system is well protected against damage which would otherwise result from direct exposure of the tie rods. Furthermore, the extent of toeing of the front wheels which is caused by bounding and rebounding thereof and the kickback on the steering handlebar due to such toeing are reduced by positioning the point where the connected rod is pivotally coupled to the steering arm within a space range between, as viewed in side elevation, the upper and lower straight lines interconnecting the point where the leading arm is pivotally coupled to the frame and the positions which are reached by the distal end of the leading arm when the front wheels bound and rebound.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:
1. A steering system in a motor vehicle having a frame, comprising:
   a pair of steerable wheels;
   a swing arm by which said steerable wheels are swingably supported on said frame;
   a steering shaft extending substantially vertically in said frame and angularly movable about its own axis;
   a steering arm fixed to a lower end of said steering shaft;
   a connecting rod having one end pivotally coupled to said steering arm;
   a pivot arm swingable in unison with said swing arm and operatively coupled to an opposite end of said connectng rod; and
   a pair of tie rods having ends pivotally coupled to said pivot arm and opposite ends on which said steerable wheels are angularly movably supported;
   said swing arm comprises two substantially parallel members extending in a longitudinal direction of said frame, a shaft interconnecting said parallel members at ends thereof, and an axle support member interconnecting opposite ends of said parallel members and supporting said steerable wheels swingably with respective knuckle arms thereon, said swing arm being swingably supported by said shaft on said frame.

2. A steering system according to claim 1, wherein said pivot arm is pivotally supported substantially centrally on said axle support member.

3. A steering system according to claim 2, further including a pair of cushioning units having upper ends coupled to said frame and lower ends coupled to said axle support member respectively near opposite ends thereof, said tie rods extending along said axle support member rearwardly of said cushioning units.

4. A steering system according to claim 3, wherein said steering arm is in the form of an elongate plate, said steering shaft being fixed to one end of said elongate plate, said one end of said connecting rod being pivotally coupled to an opposite end of said elongate plate.

5. A steering system according to claim 2, wherein said pivot arm has a first arm member and a second arm member, said opposite end of said connecting arm being pivotally coupled to said first arm member, said ends of said tie rods being pivotally coupled to said second arm member.

6. A steering system according to claim 5, wherein one of said parallel members comprises a sleeve accommodating a propeller shaft therein, said axle support member accommodating therein a drive axle with opposite ends coupled to said steerable wheels; and said motor vehicle respectively, further including a gear case mounted on said axle support member for transmitting output power from said propeller shaft to said drive axle.

7. A steering system according to claim 2, wherein a point where said connecting rod is coupled to said steering arm is positioned in a space range which is swept by said swing arm when it is angularly moved about said shaft.

8. A steering system according to claim 7, wherein said space range includes a range in which said swing arm is angularly moved when said steerable wheels bound and rebound to maximum levels.

9. A steering system according to claim 2, wherein a point where said connecting rod is coupled to said steering arm is positioned substantially on said shaft.

* * * * *

UNITED STATES PATENT AND TRADEMARK OFFICE
CERTIFICATE OF CORRECTION

PATENT NO. : 4,749,205

DATED : June 7, 1988

INVENTOR(S) : Hirotake TAKAHASHI et al.

It is certified that error appears in the above-identified patent and that said Letters Patent is hereby corrected as shown below:

```
Column 1, line 33, change "disadvantageously" to
--disadvantageous--.
Column 2, line 39, change "covred" to --covered--;
          line 55, change "lateraly" to --laterally--;
          line 61, change "extend" to --extends--.
Column 3, line 3,  change "lateraly" to --laterally--;
          line 18, after "cushioning" insert --units--;
          line 29, change "knucle" to --knuckle--;
          line 40, change "arm" to --is--;
          line 63, change "the" (first occurence) to
--The--.
Column 4, line 4,  change "rear" to --front--;
          line 62, change "end" to --arm--.
Column 5, line 10, after "in" change "a" to --an--;
          line 13, after "bounding" change "the" to
--and--;
          line 38, change "interfer" to --interfere--.
Column 6, line 16 (claim 1, line 15), change "connectng"
to --connecting--;
          line 42 (claim 5, line 1), change "2" to --4--;
          line 51 (claim 6, line 5), after "wheels"
delete the semicolon.
```

Signed and Sealed this

Eighth Day of November, 1988

Attest:

DONALD J. QUIGG

Attesting Officer

Commissioner of Patents and Trademarks